(12) United States Patent
Lotito (10) Patent No.: US 9,906,891 B2
(45) Date of Patent: Feb. 27, 2018

(54) APPARATUS ADAPTED TO SHARE INFORMATION CONTENTS THROUGH A WIRELESS CONNECTION, AND METHOD THEREOF

(71) Applicant: S.I.SV.EL. SOCIETA' ITALIANA PER LO SVILUPPO DELL'ELETTRONICA S.P.A., None (IT)

(72) Inventor: Antonio Lotito, Gassino Torinese (IT)

(73) Assignee: S.I.SV .EL. SOCIETA' ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 0 days.

(21) Appl. No.: 14/443,596

(22) PCT Filed: Nov. 18, 2013

(86) PCT No.: PCT/IB2013/060213
§ 371 (c)(1),
(2) Date: May 18, 2015

(87) PCT Pub. No.: WO2014/076676
PCT Pub. Date: May 22, 2014

(65) Prior Publication Data
US 2015/0334513 A1    Nov. 19, 2015

(30) Foreign Application Priority Data

Nov. 19, 2012 (IT) .............................. TO2012A1003

(51) Int. Cl.
*H04B 7/00* (2006.01)
*H04W 4/00* (2018.01)
*H04M 1/725* (2006.01)

(52) U.S. Cl.
CPC ......... *H04W 4/008* (2013.01); *H04M 1/7253* (2013.01); *H04M 2250/02* (2013.01); *H04M 2250/04* (2013.01); *H04M 2250/64* (2013.01)

(58) Field of Classification Search
CPC ........... H04M 1/7253; H04M 2250/02; H04M 2250/04; H04M 2250/64; H04W 4/008
(Continued)

(56) References Cited

U.S. PATENT DOCUMENTS 7,406,294 B1 * 7/2008 Liu .......................... H04L 67/04
455/3.06
2004/0078169 A1 4/2004 Oba et al.
(Continued)

FOREIGN PATENT DOCUMENTS

CN    101114901 A    1/2008
CN    101233699 A    7/2008
(Continued)

OTHER PUBLICATIONS

Italian Search Report dated Aug. 7, 2013, issued in Italian Application No. TO20121003, filed Nov. 19, 2012.
(Continued)

*Primary Examiner* — Eugene Yun
(74) *Attorney, Agent, or Firm* — Workman Nydegger (57) ABSTRACT

An apparatus (1) adapted to share information contents through wireless connection includes a processor adapted to read at least one information content (65) from memory (3, 4, 7) and at least a radio communication module (2) adapted to automatically transmit at least one information content (65) to an electronic device (80) as a consequence of the fact that the electronic device (80) is located in the radio communication range of the radio communication module (2), without the need for explicitly entering into the apparatus (1)
(Continued)

or into the electronic device (80) any specific command for transferring the information content (65).

27 Claims, 9 Drawing Sheets

(58) Field of Classification Search
USPC ........................................................ 455/41.2
See application file for complete search history.

(56) References Cited

U.S. PATENT DOCUMENTS

| | | |
|---|---|---|
| 2004/0176032 A1 | 9/2004 | Kotola et al. |
| 2006/0189348 A1 | 8/2006 | Montulli et al. |
| 2006/0242357 A1 | 10/2006 | Chang et al. |
| 2006/0258289 A1 | 11/2006 | Dua |
| 2007/0001853 A1 | 1/2007 | Otranen |
| 2009/0097059 A1* | 4/2009 | Iijima .................. G06F 21/608 358/1.15 |
| 2010/0081376 A1 | 4/2010 | Emura |
| 2010/0328469 A1* | 12/2010 | Hashimoto ........... G06F 3/1454 348/207.1 |
| 2014/0053080 A1 | 2/2014 | Lessing |

FOREIGN PATENT DOCUMENTS

| | | |
|---|---|---|
| CN | 101369828 A | 2/2009 |
| CN | 101416412 A | 4/2009 |
| CN | 102315864 A | 1/2012 |
| CN | 102769482 A | 11/2012 |
| CN | 102780513 A1 | 11/2012 |
| DE | 10 2010 003 883 A1 | 2/2012 |
| EP | 2 434 721 A1 | 3/2012 |
| JP | 2001-331605 A | 11/2001 |
| JP | 2003-85659 A | 3/2003 |
| JP | 2010-87541 A | 4/2010 |
| WO | 2009/022244 A2 | 2/2009 |

OTHER PUBLICATIONS

International Search Report dated Feb. 21, 2014, issued in PCT Application No. PCT/IB2013/060213, filed Nov. 18, 2013.
International Preliminary Report on Patentability and Written Opinion dated May 19, 2015, issued in PCT Application No. PCT/IB2013/060213, filed Nov. 18, 2013.

* cited by examiner

APPARATUS ADAPTED TO SHARE INFORMATION CONTENTS THROUGH A WIRELESS CONNECTION, AND METHOD THEREOF

The present invention refers to an apparatus and a method adapted to share information contents through wireless connection, particularly through NFC connection ("Near Field Communication").

It is known that various technologies exist allowing the connection among electronic devices, e.g. Wi-Fi ("Wireless Fidelity") RFID ("Radio Frequency Identification"), NFC and Bluetooth. Said technologies are often and often implemented in electronic devices using them to transmit and receive every kind of information contents, for instance textual documents, images, musical files, video files, and so on. Every technology has its own operating method, that is, a communication protocol defining semantics, syntax and timing of the operations capable to connect two or more devices. The devices commonly used for the above mentioned operations are, for instance, the "Smartphones", that is mobile phones provided with a complex operating system such as that of a personal computer, the "Tablet PCs" or shortly "Tablets", also provided with a complex operating system, the "Notebooks", real personal computers and so on. Moreover, "stand-alone" devices using the NFC technology in "Read/Write" mode are known, that is the mode with which it is possible to read and write data in either a NFC Tag or a NFC Card, or in a "Card emulation mode", that is the mode with which it is possible to carry out electronic payments. As regards the "Peer-to-Peer" mode, it is usually applied in electronic devices such as, for instance, Smartphones or the like, just to directly exchange information contents among themselves.

However, it is unknown to use the "Peer-to-Peer" mode in "stand-alone" devices sharing information contents with other electronic devices.

It is further known that, for instance, said "stand-alone" devices can share information contents through Bluetooth connection; but the Bluetooth protocol provides that the transmitter has to decide to send an information content in its communication range, and that the receiver has to accept, or at least to accept in advance the information content itself.

However, such a Bluetooth mode, providing the connection configuration, does not allow a user to easily choose to whom send an information content, for instance a document, as he/she should have to discriminate among different users and should risk sending the same document many times to a same device finding itself in its own radio range.

Let's consider an exemplary scenario, such as that of a fair or a museum, wherein a visitor goes to a stand, to obtain information and/or descriptive material, for instance a brochure, relating an interest object displayed in the stand or in the museum exhibition space. In such a situation the technology Bluetooth should not be suited to the purpose of a sharing of electronic documents, because in such a case the document holder had to continuously in the time send his/her own document to all the users in the communication range, without any possibility of discriminating the users themselves. Thus they would happen unwelcome "spam" phenomena.

Moreover, nowadays, such an illustrative material is provided in paper form or in a USB ("Universal Serial Bus") key given to the visitor, and this requires a heavy paper and USB memory device waste, as well as an economic expense.

The NFC technology uses a very reduced communication range (of the order of 1 or 2 centimeters) and, as previously told, supports three operating modes: "Read/Write", "Card emulation mode" and "Peer-to-Peer". The transmission rate presently reaches 424 Kbit/s, and thus is adapted for transferring small size files. This modest transmission rate led to the occurrence of some technological solutions, using NFC as a support protocol, above all to establish a second connection with a different protocol, for instance Bluetooth, providing higher transmission rates, of the order of a multiplying factor 10 and thus higher than 3 Mbit/s (Mega bit per second). In this case, the setting times of a connection with different protocol, for instance Bluetooth, are not absolutely negligible.

Further, are under research solutions for NFC incrementing the transmission rate by a multiplying factor 10, that is reaching a transmission rate higher than 3 Mbit/s, and thus comparable with the transmission rate of the Bluetooth protocol. This should allow the NFC technology to be used also for the sharing of information contents of greater size in terms of bytes, for instance musical files, video files and so on.

It is therefore an object of the present invention to indicate an apparatus and a method adapted to share information contents through wireless connection, particularly through NFC connection, thoroughly reducing the setting times of a connection among electronic devices and in particular avoiding troublesome activation steps of the connection such as password or PIN insertion and the connection request and/or file transfer acceptance by the sending and/or receiving device.

A further object of the present invention is to indicate an apparatus and a method adapted to share information contents through wireless connection, particularly through NFC connection, allowing to avoid "spam" phenomena during the sharing of information contents, that is sending or receiving files or other unwanted contents, which were not voluntarily requested by the user.

A further object of the present invention is to indicate an apparatus and a method adapted to share information contents through wireless connection, particularly through NFC connection, allowing a user to decide at any time the receiving of an information content on his/her own mobile device.

These and other objects of the invention are obtained by an apparatus and a method to share information contents through wireless connection, particularly through NFC connection, as claimed in the enclosed claims making up integral part of the present specification.

In short, it is described an apparatus adapted to share information contents through wireless connection, said apparatus comprising processing means adapted to read at least one information content from storage means, at least a radio communication module adapted to automatically transmit said at least one information content to an electronic device as a consequence of the fact that said electronic device results into the radio communication range of said radio communication module, without to be explicitly inserted in said apparatus or in said electronic device any specific transfer command of said information content. Further features of the invention are the subject matter of the enclosed claims intending to be integral part of the present specification.

BRIEF DESCRIPTION OF THE DRAWINGS

The above mentioned objects will appear clearer from the detailed description of an apparatus and a method adapted to share information contents through wireless connection, specifically through NFC connection, according to the present invention, with particular reference to the enclosed Figures, wherein.

DETAILED DESCRIPTION OF THE PREFERRED EMBODIMENTS

Figure 1:
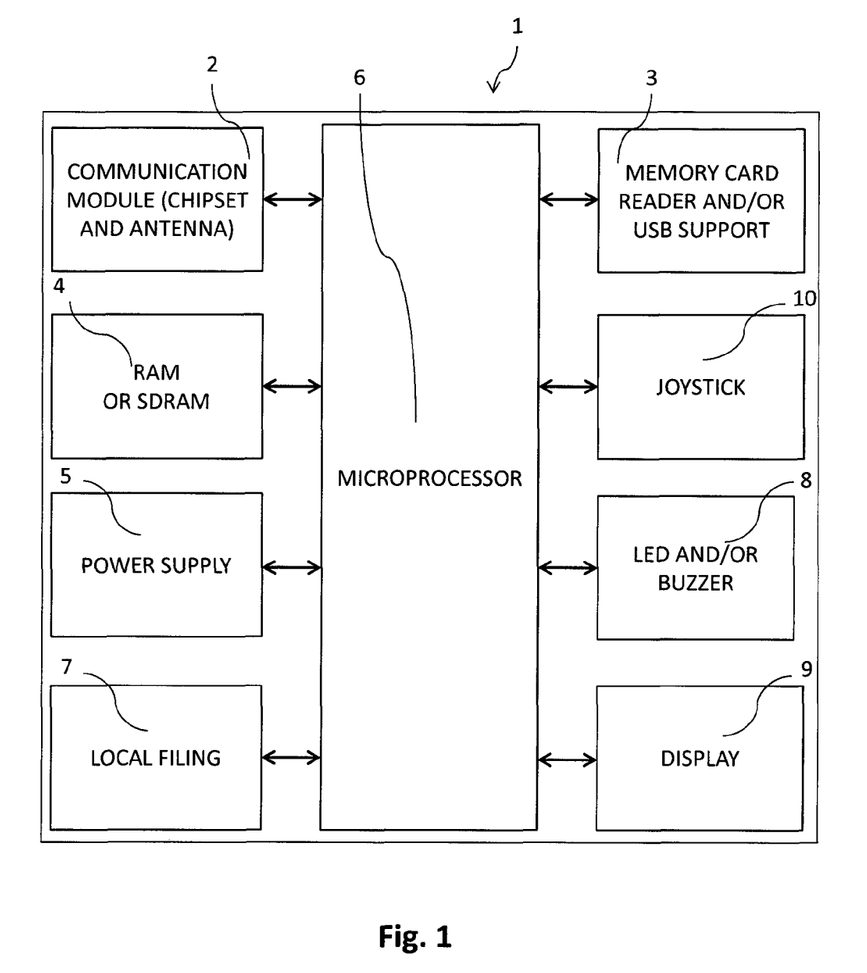
FIG. 1 illustrates an example of block diagram of the apparatus according to the present invention.

With reference to FIG. 1, it is illustrated an apparatus 1, in accordance with the present invention, comprising at least a communication module 2, at least a storage means reader 3, first memory means 4, at least a power supply module 5 and processing means 6.

The apparatus 1, in accordance with this invention, is an electronic "stand-alone" device, that is able to supply electronic files to other connected devices, without having the need to be in turn, permanently connected to a computer controlling its operation; specifically it allows to share, that is transmit, information contents to other electronic devices adopting the same communication wireless protocol.

The communication module 2 can be a module implementing the NFC protocol and, in a preferred embodiment, the transfer modality used is the "Peer-to-Peer", namely a modality in which the data exchange happens just between the apparatus 1 and only one other mobile device to implementing the NFC protocol in "Peer-to-Peer" mode. Such a communication module 2 comprises both the chipset, namely the assembly of integrated circuits adapted to implement the NFC transmission protocol, and the antenna.

The storage means reader 3 can have one or more compartments ("slot") 68 to accommodate various kinds of removable memories 60, for instance, either an electronic memory card or a USB electronic memory. The removable memories can contain the information contents wanted to be transmitted through the communication module 2. Such a storage means reader 3 can be intended as a memory means under all respects.

The first memory means 4 can be volatile memories, for instance a RAM ("Random Access Memory") or a SDRAM ("Synchronous Dynamic Random Access Memory"), able to store the information content of the removable memories to avoid continuous reading therefrom.

The power supply module 5 provides to supply electric current to the apparatus 1 and may be an AC ("Alternating Current") to DC ("Direct Current") adapter, a battery or a USB gate adapted to be used for power supply from a personal computer.

The apparatus 1 comprises also processing means 6 which are able to drive the reader of the memory means 3 and the communication module 2. Moreover, it is provided with a firmware wherein a "pushing" logic is implemented, for instance through NFC. Said processing means 6 can also manage base modules (memory means 3 and the communication module 2), and the operations connected to the "push", for instance of the NFC protocol. Within the scope of this application the terms "push" or "pushing" intend a kind of transmission wherein some information data are provided to an electronic device 80 on initiative of the transmitting device 1 at the occurrence of a predetermined event, and not on explicit request inserted by the user in the electronic device 80 or transmitting device 1. In the case of the present invention such an occurrence corresponds at last in fact that any receiving device adapted to establish a connection, for instance of NFC type, with the apparatus 1, is in its radio range and this event is detected by said apparatus. In the apparatus according to the present invention the data or information contents are transferred to the electronic device 80, arranged in the immediate vicinity, without explicit insertion in the apparatus 1 or in the electronic device of any specific transfer command of the information content. Further, the apparatus 1 can comprise second memory means 7 of the not volatile type, able to store the information content of a removable memory inserted in the reader of memory means 3, and to give a user the opportunity of extracting the removable memory 60 after having copied the information content.

In another embodiment, the apparatus 1 comprises also signalling means 8, for instance one or more LED ("Light Emitting Diode") signalling lamps having colour and/or fixed or variable brightness (so providing a visual signal) or a beeper (also told a "buzzer", so providing a sound signal). Said signalling means 8 can be useful to signal to the user, for instance, that the information content has been copied from the removable memory in the first memory means 4, or the information content has been successfully sent to another electronic device through the communication module 2, or further that the battery of the apparatus 1 reached a lowest or a highest charge level. Generally, said signalling means 8 signal to a user at least an operation carried out by said apparatus 1 or the fact of being in some operating state.

Figure 2:
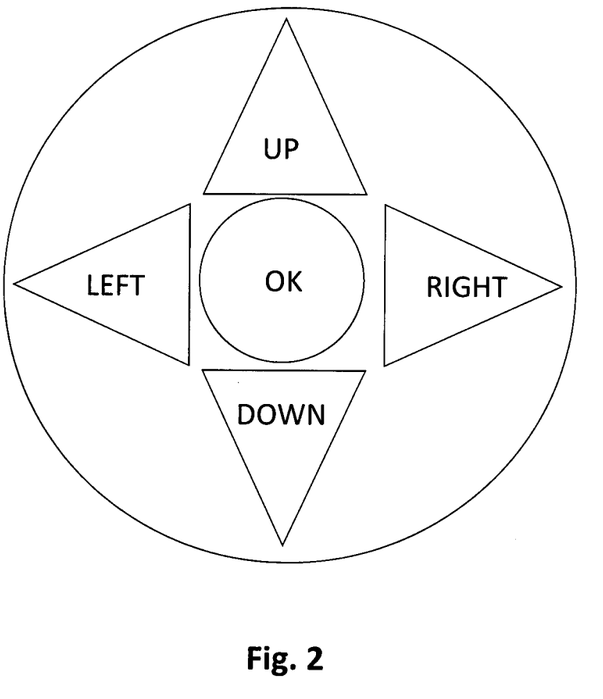
FIG. 2 illustrates an embodiment of a user interface of the FIG. 1 apparatus.

In another embodiment, the apparatus 1 comprises also display means 9 and a user interface 10. The display means 9 can be, for instance, a traditional LCD display able to display alphanumeric characters and simplified graphs. In a simpler embodiment of the apparatus 1 the display can show the name and the place (name of the electronic file) of the information contents present in the local memory 7 or in the removable memory 60 inserted in the reading unit 3, that is the file system content of the apparatus 1. The choice of the files, to be sent through, is carried out through the user interface 10, such as a "joystick" or a push-button strip, which at every operation, glances through the list of the present files in the memory support and selects that of proper interest to be sent. In a preferred embodiment, the "joystick" or push-button strip can be in a cross shape with inside a further push-button for confirmation, as depicted in FIG. 2. Further, through the user interface 10 it is possible to carry out operations on the information content, as for instance the erasure, the copy and the transfer of the information contents accessible from the apparatus 1, and so on. In said condition, the user of the apparatus 1 can decide which information contents transmit to the electronic device 80 (just only a file, some files or all the files accessible to the apparatus 1 or all those contained in a particular memory thereof, for instance the local one 7) by individually selecting the files and/or the electronic folders containing them through the user interface (10) and so speed up the distribution of the information contents themselves, without having to change every time a removable memory for every file to be transmitted. The display means assist the user in the choice showing time by time the content of the memory selected by the user, that is the files and/or folders selected by the user during the featuring operations of the apparatus 1.

In a more sophisticated embodiment of the apparatus the display means can include a "e-ink" display (display technology designed to simulate the appearance of the ink on a normal paper sheet) which, besides the display of the file system disclosed in the previous paragraph, provides the user with the display of the information content present in the memory means 7 or in the removable memory 65 accommodated in a compartment 68 of the memory means 3.

Therefore, from just the hardware view point, it is about an apparatus 1 which can be independently power supplied from the communication module 2 (through a power supply module 5), for instance from the NFC communication module, and inside providing at least a communication module 2, processing means 6, first memory means 4 and at least a memory means reader 3.

The method according to the present invention, and the related apparatus adapted to embody said method, provides for interfacing among them the above mentioned elements and for acceding to the first memory means 4, to the removable memories and to the second memory means 7, as well as to the various "file systems" by them provided. In addition, it provides to manage all the operations related to the sharing of the information contents, through the communication module 2, with at least an electronic device 80 located in the communication range of the apparatus 1.

The electronic device 80 can be a "Smartphone", a "Tablet PC", a "Notebook", an "E-book", or any other mobile device or however easily portable device adopting the same communication protocol of the apparatus 1.

The method according to the present invention so provides to operate the automatic transmission of the information contents just when said device is located in the communication range of the apparatus 1.

The method can manage three possible logical states or operating modes of the apparatus 1, supposed to be on, that is electrically supplied:

Setting;

Normal use;

Idle (Inactive).

Figure 3:
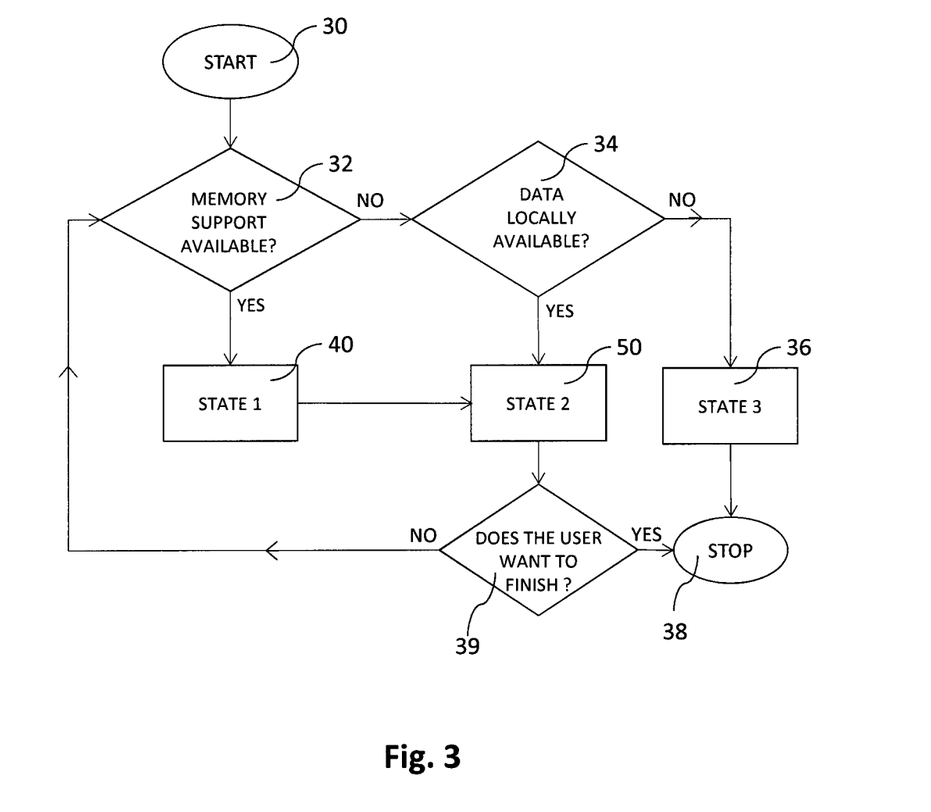
FIGS. 3, 4 and 5 depict examples of flow charts relating the operating logic of an apparatus according to the present invention.

With reference to FIG. 3, the operating flow chart of the apparatus in accordance with the present invention is shown. The apparatus provides to check the presence of at least one removable memory (step 32) and, if present, the apparatus carries out the operations provided in the first setting step called "State 1" (step 40) later described. If none removable memory is present in the reader of the memory means 3, then the apparatus checks the presence of information contents in the second memory means 7 and copies them in the first memory means 4 (step 34). If they are present, then the apparatus carries out the operations provided in the second step of normal use called "State 2" (step 50) also later described, otherwise goes to the third step "Idle" (Inactivity) called in FIG. 3 "State 3" (step 36) also later described. At the end of the second step a check of user presence is carried out, that is it is checked if the electronic device 80 is still present in the communication range of the apparatus 1 (step 39), should it not be then it returns to the step 32, otherwise the method stops (step 38). From the "State 3", namely from the step 36, it would exit in case of insertion by a user of a removable memory in the reader of the memory means 3 of the apparatus 1 (step 32), and then it would directly restart from the "State 1" (step 40).

Figure 4:
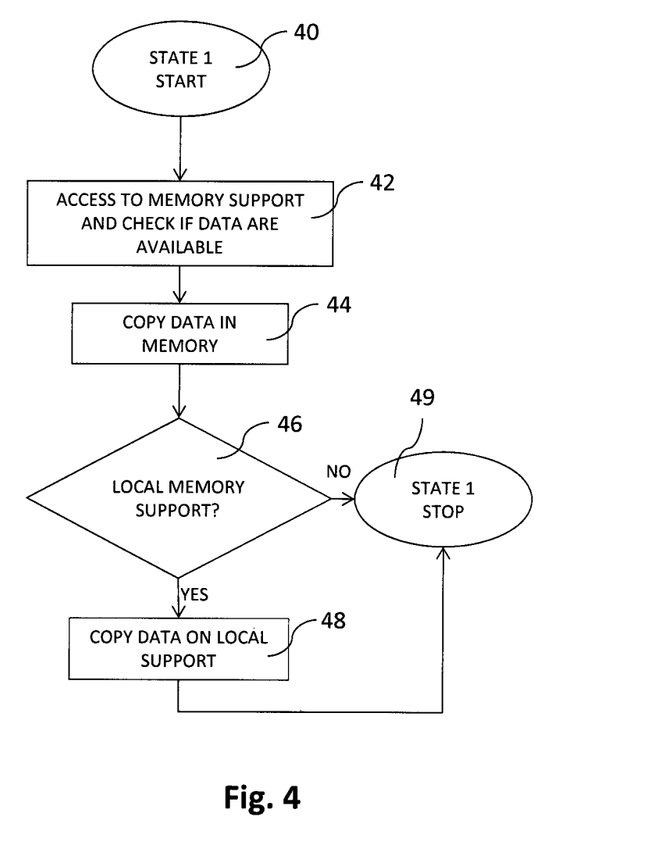

With reference to FIG. 4, the first step called "State 1" is depicted, wherein the apparatus, in accordance with the present invention, carries out the functions to accede to the reader of memory means 3, and then reading the information content from a removable memory 60 inserted by a user (step 42), copying the content intended to share in the first memory means 4 (step 44) and, if the apparatus 1 is provided with second memory means 7 (step 46), copying also in the last such an information content (step 48), otherwise the process stops (step 49).

Figure 5:
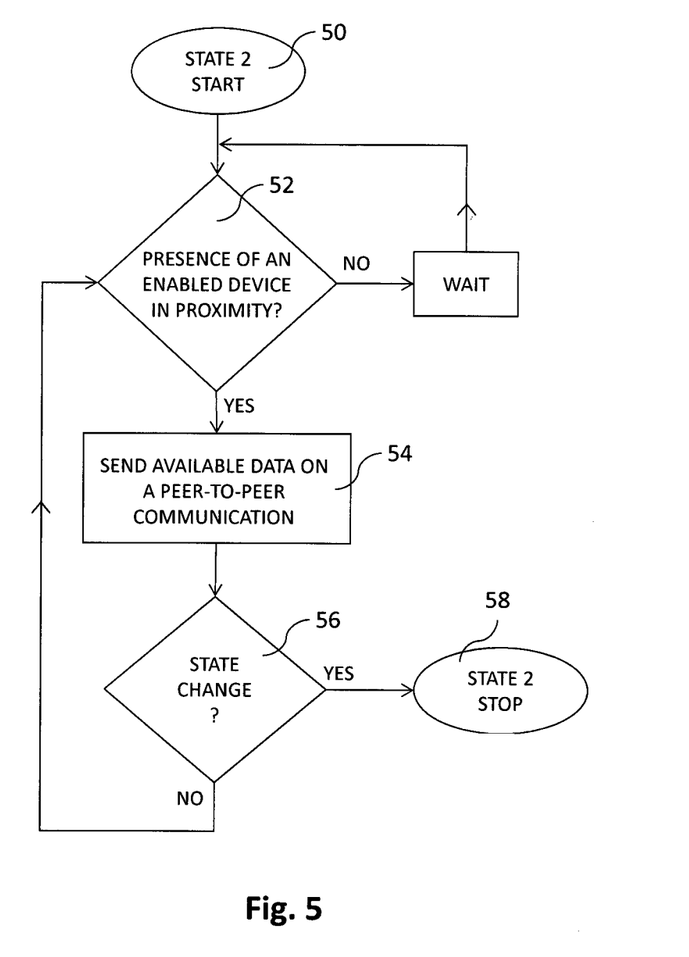

With reference to FIG. 5, the second step called "State 2" is depicted, which is requested either at the end of the first step or at the check end in the step 34. In said "State 2" the apparatus, in accordance with the present invention, provides to detect the presence of an electronic device 80 implementing the communication protocol itself of the apparatus 1 (step 52), specifically the NFC protocol, suited to support the data transfer mode "Peer-To-Peer". Further, the apparatus according to the invention provides to establish a "Peer-To-Peer" communication therewith. A further step is sending the information contents present in the first memory means 4 and/or in the second memory means 7 and/or in the removable memory 60 exploiting the above mentioned data transfer mode (step 54). Later, it is provided a step wherein it is detected the change from a state to another (step 56); if the state is changed then the process stops (step 58), otherwise it returns to the step 52; in any case the "Peer-To-Peer" communication is closed.

Referring again to FIG. 3, during the "State 3", the apparatus according to the invention cannot do any of the two above described steps ("State 1" or "State 2") and, after some time, automatically proceeds to its own switching off.

As application example, let us consider a possible scenario of invention use such as in a fair, wherein a visitor goes to a stand, for obtaining information and/or descriptive material, for instance a brochure, relating an interesting object displayed in the stand. In such a context, the apparatus 1 according to the present invention allows a user, interested to obtain one or more electronic documents, to approach, or practically to touch, with his/her own electronic device 80 (for instance a "Smartphone") the apparatus 1 and to obtain the set of the desired documents; then the user is compelled to make a voluntary act. That is permitted by the use of a short range communication technology (for instance NFC), that is a typical communication range of 1 or 2 centimeters.

As regards the active user of the method according to the invention, he has as only job that of copying in advance the information material to distribute to the visitors, on a removable memory support such as, for instance, a SD card ("Secure Digital memory card"), a Micro-SD, a USB ("Universal Serial Bus") pen, and so on, and insert such a memory support in the apparatus 1.

Further, the distributed brochures are in electronic format, therefore is not used any paper, producing a noticeable economic saving for the stand exhibitor and reducing the environmental impact for the community.

Figure 6:
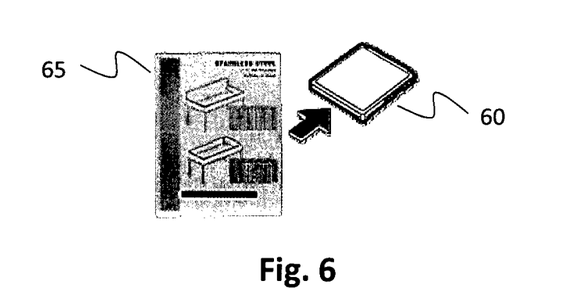
FIG. 6 depicts the copy steps of an information content on a memory card.
Figure 7A:
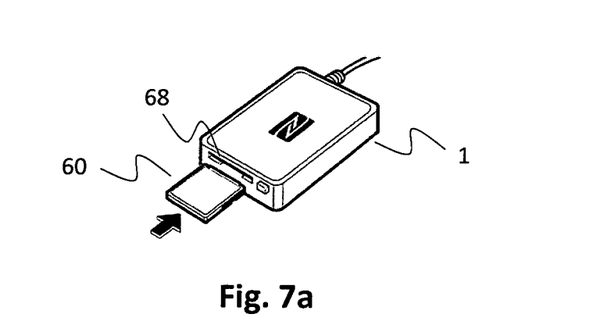
FIGS. 7a and 7b depict the insertion step of a memory support in an apparatus according to the present invention.
Figure 7B:
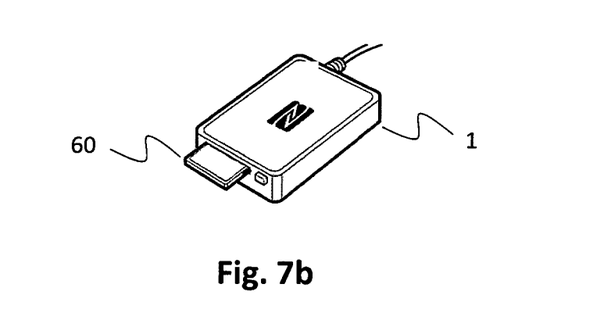
Figure 8:
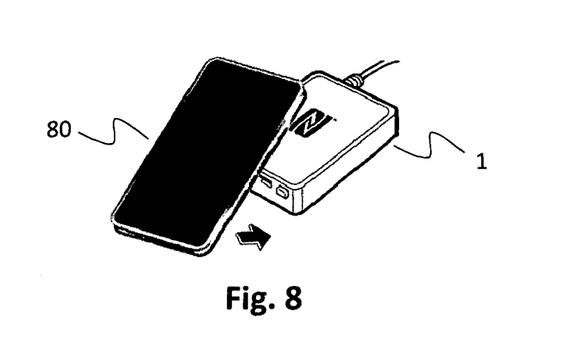
FIG. 8 depicts, from a user, an approach step of a mobile device to an apparatus according to the present invention.
Figure 9A:
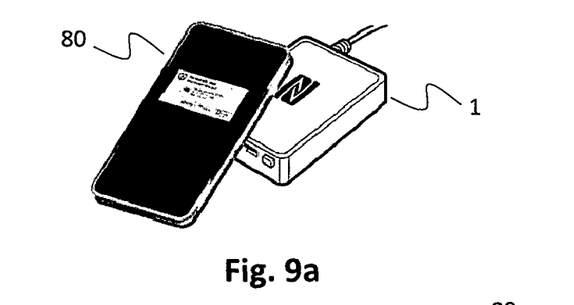
FIGS. 9a and 9b depict the use, by a user, of the information contents.
Figure 9B:
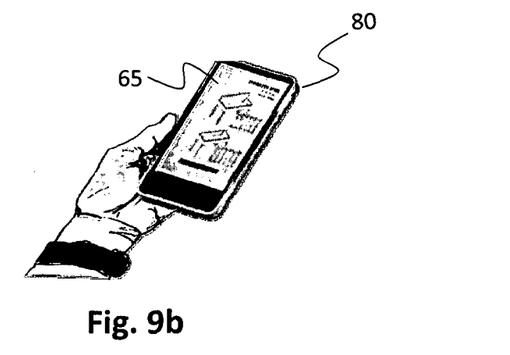

Furthermore, the use of just a protocol and a short range communication in "Peer-to-Peer" mode allows to reduce the configuration time between the apparatus 1 and the electronic device 80 coming in the communication range thereof. Coming back to the exemplary scenario previously described, the exhibitor does not have to insert any command in the apparatus 1, but merely having previously loaded its own electronic document 65 in the removable memory 60 and inserting it in the apparatus 1 (FIGS. 6, 7*a*, 7*b*); for his/her part, the visitor desiring to receive such a document will have simply to have his/her electronic device 80 enabled to short range communication (for instance NFC) and putting the same on the apparatus 1 (FIG. 8). At that time the electronic document 65 will be automatically copied on the electronic device 80 upon consent of the visitor (FIG. 9*a*), implicitly grant with the voluntary approach of the electronic device 80 to the apparatus 1 and the latter will be able to enjoy the use of the information contents 65 (FIG. 9*b*). It is to notice that in the embodiment of the invention depicted in the FIGS. 7, 8 and 9 it is not necessary to leave the memory card 60 containing the file 65 inserted in the compartment 68 of the reading unit 3 during the transfer step of the files to the Smartphone 80: in fact the apparatus 1 previously provided to copy, either automatically or on explicit command of the user, the file 65 in his central memory either RAM or SDRAM 4 and/or in the local mass memory 7.

Further, the visitor can so load on his/her own electronic device 80 many documents or other information contents, avoiding to "collect" a lot of paper documents and other objects (CD, memory supports) making his/her visit to the fair poorly easy.

Always in such a context, for instance, if a communication technology, having larger communication range, were used, for instance with communication range of the order of one or more meters, it would be impossible for the exhibitor to discriminate to which visitor transmit the document, so compelling the exhibitor to transmit in "broadcast" mode (to all users present in the communication range) and, as a consequence, would appear unwanted "spam" phenomena, that is the same document probably would be transmitted many times to the same visitor, as well as to visitors not interested to the document, as they did not give their consent to such a transmission.

Should the communication technology Bluetooth be used, there is further the problem to configure the association between the apparatus 1 and the electronic device 80 of the visitor, but such a configuration would have to be carried out for every stand, as every stand should have a different Bluetooth device to transmit its own information content. Therefore, the visitor should be compelled to configure the connection association for his/her own electronic device 80 with the apparatus 1 whenever he/she desires to find information content from an exhibitor, so causing considerable discomfort and waste of time for the visitor him/herself, as well as running into further configuration problems with consequent time waste. On the contrary, with the apparatus and the method in accordance with the present invention, unwanted and "spam" phenomena do not occur and does not exist the problem to configure a connection every time the visitor desires to find on his/her own electronic device 80 an information content of his/her interest.

What just described represents just a possible embodiment of the present invention. It is possible to expect, for instance, also the presence of a hardware switch allowing the transition from "State 1" to "State 2" to streamline the procedure during the normal operation ("State 2"). It is possible also provide that the "State 3" is really a stand-by power saving state, wherein the apparatus 1 minimizes the power consumption, but is always waiting for the insertion of a memory support in the apparatus 1, in which case automatically wakes up and goes to the operating State 2, becoming ready to deliver the electronic documents (files) modelled to be automatically transmitted to the terminals into the range of its radio communication module 2.

At last, the method according to the present invention will also be able to recognise the presence of "special" configuration files, to therewith carry out the updating of the software of the apparatus 1 and of the libraries of the communication protocol (for instance, in case of updating of the of the "Peer-to-Peer" protocol). From the operating view point, the "blank" apparatus, that is just coming from a manufacture, will be in the "State 3", waiting for a memory support to be inserted in its inside. As soon as it will be detected, such a support will automatically be transferred in the "State 1" and from this in the "State 2".

From this time on, the apparatus 1 will always automatically repeat the sending of the same file till a different decision, for instance following the insertion of a removable memory, containing new files or following operating setting modifications of the apparatus 1 operated by the user on a configuration step ("State 1").

In this step, the apparatus 1 will be always ready to detect the presence of an electronic device supporting a short range technology and a "Peer-to-Peer" protocol. Once detected an electronic device checking the necessary requirements, a communication channel will be established with it and on this will be sent the file subjected to the transfer, without any command inserted for that purpose on the apparatus 1 or on the electronic device 80. Once completed the transfer, the apparatus 1 will close the communication channel with the electronic device 80 and will be ready for a new interaction.

In addition, it is important to specify that what has been described represents just the simplest and generic use case, but it is possible to provide adjustments to the method permitting to manage different user typologies with access to different files and/or manage distribution lists (for instance "White-List" rather than "Black List") and/or different rules.

Figure 10:
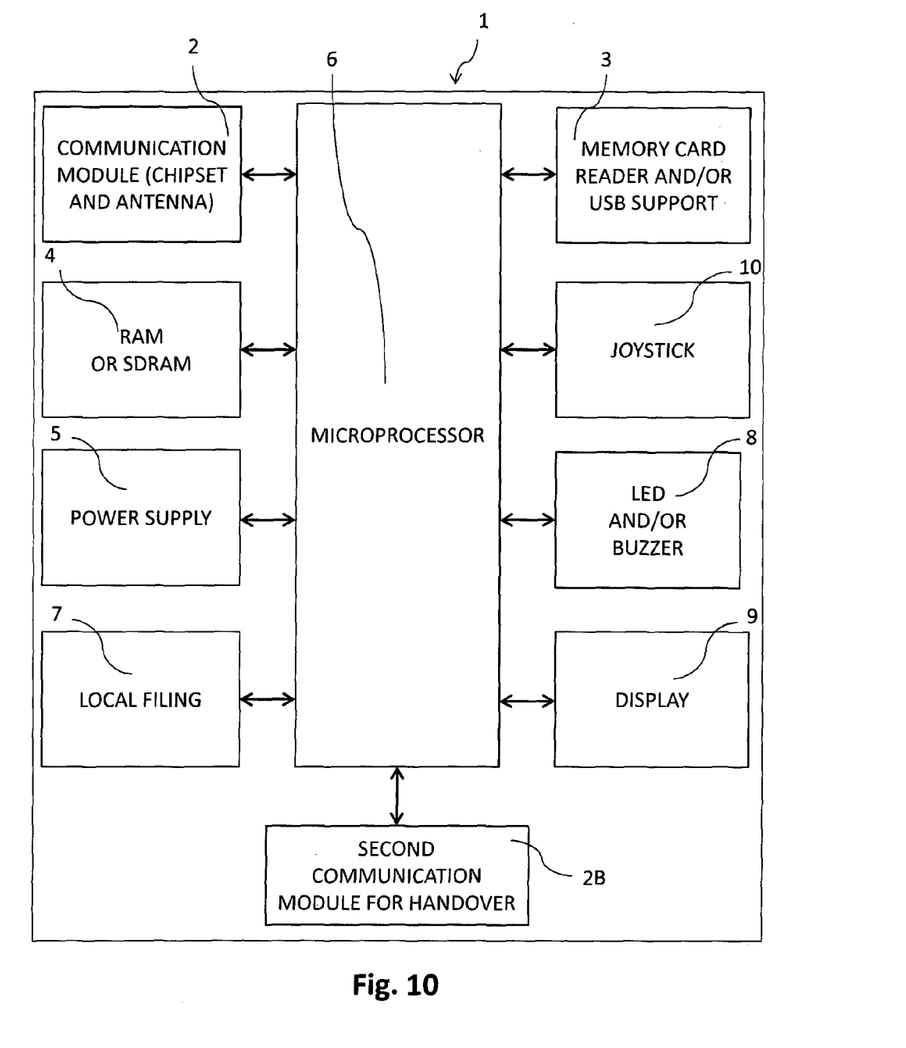
FIGS. 10 and 11 respectively depict in exemplary way a block diagram and a flow chart relating the operating logic of an apparatus according to the present invention.

In another embodiment, referring to FIG. 10, the apparatus 1 comprises a second radio communication module 2B, different from radio communication module 2, preferably supporting a communication rate higher than that provided by the radio communication module 2. Further, the protocol adopted by the second radio communication module 2B can be different from that adopted by the radio communication module 2; for instance, it can be a protocol type as Bluetooth, Wi-Fi, Wi-Fi Direct and so on, which, preferably can support a wireless connection on ranges also longer with respect to that permitted by the first radio communication module 2. In such an embodiment, the first communication channel made through the radio communication module 2 is for finding the connection information (configuration) for establishing the communication with the electronic device 80 through the second radio communication module 2B. Said information can be, for instance, the access credentials, the channel frequency, the network label and so on. By using this operating mode, it is exploited a first low rate channel to find the connection information to establish a connection on a second high rate channel, or however a rate higher than that of the first channel, on which make the files 65 to pass to be transferred between the apparatus 1 and the electronic device 80. The information content 65 can be sent preferably through the second radio connection, having used the first one exclusively for establish the second one; however, it is possible also to provide to send the information content 65 simultaneously through both channels by means the radio communication modules 2 and 2B, at the cost of dividing and coordinating the flow of data transferred in parallel from the apparatus 1 to the electronic device 80 on two different radio channels.

In the meantime, the activation on the second channel is automatic and fast, so excluding the manual intervention in the setting of the second connection. In fact, on the first radio connection, the apparatus 1 previously sends to the electronic device 80 the necessary data for the establishment and the maintenance of the connection channel (additional to the first or exclusive one) necessary for the transfer of the information content 65 (as one or more files) to be distributed in peer-to-peer mode and which has been previously stated by the user of the apparatus 1. It is natural that a radio communication module supporting the protocol adopted on the second channel has to be present also on the electronic device 80. Also in this case, the setting times of file transfer among electronic devices are dramatically reduced, so increasing the transfer rate. The above described operation mode is told "handover".

Further in this other embodiment it is no more necessary that the electronic device 80 is held at the short operating range of the first radio connection system, for instance, of NFC type, however without generating the annoying spam phenomenon present in long range information content distribution systems; in fact the file transfer always occurs in point-to-point mode (peer-to-peer) just from apparatus 1 to electronic device 80. Further is maintained the "pushing" mode, that is the transfer of the information content occurs without any explicit command given by the user to the apparatus 1 or to the electronic device 80. Also in this other embodiment, in substance, the transfer of the information content 65 occurs as a consequence of having brought near enough the electronic device 80 to the apparatus 1, so that the radio communication module 2 manages to establish a communication channel with the corresponding radio communication module of the electronic device 80, which has been found in its radio range.

Figure 11:
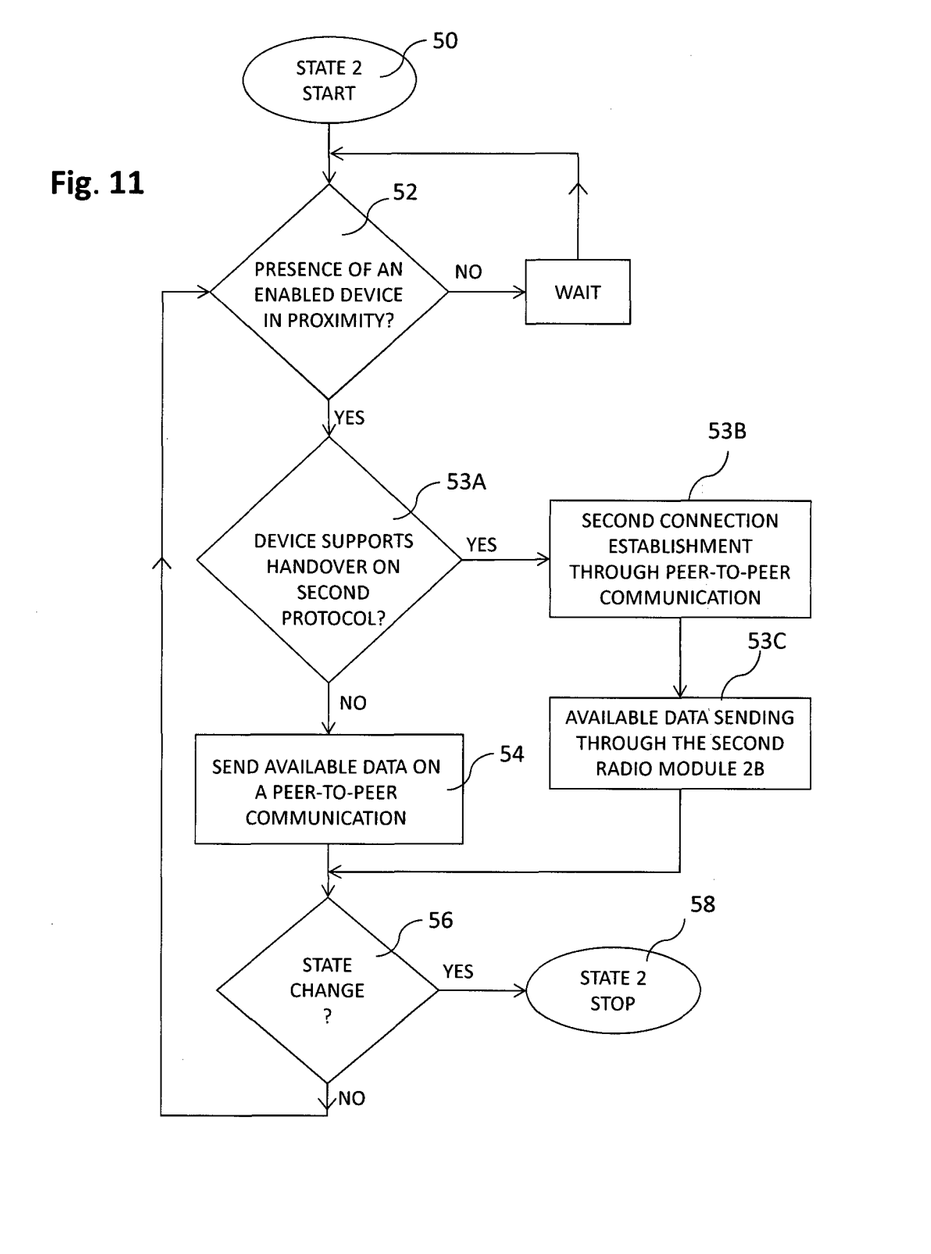

With reference to FIG. 11, the second step called "State 2" is further depicted with the insertion of the steps in which the method, and a related apparatus, in accordance with the present invention, provides to check the presence of the second radio communication protocol on the mobile device 80 (step 53A) and, in affirmative case, establishes therewith a second radio connection channel by means of the first communication protocol supported by the radio communication module 2 (step 53B). Later, the data relating the information content 65 are transferred through the second protocol (step 53C) supported by the radio communication module 2B and by a corresponding radio module, checked as available in the step 53A. If this second connection channel is not available, the data sending occurs through the first communication protocol with the radio module 2 (step 54), such as in the embodiment of the invention described in FIG. 5.

The method according to the invention can be implemented through an informatics product loadable in a memory of the apparatus 1 and comprising software code portions adapted to implement the same method.

From the carried out description therefore result clear the features of the present invention, as well as are clear its advantages.

A first advantage of the apparatus and method according to the present invention is thoroughly reducing the setting times of a file transfer among electronic devices.

A second advantage of the apparatus and method according to the present invention is to avoid "spam" phenomena during the sharing of information contents.

A third advantage of the apparatus and method according to the present invention is to allow a user to decide at will in simple and immediate way the receiving of an information content on his/her own mobile device.

A further advantage of the apparatus and method according to the present invention is to increase the money saving of a user of the apparatus due to the replacement of printed information contents with the electronic ones.

A further advantage of the apparatus and method according to the present invention is to reduce paper and information material waste, then reducing the impact on the environment by non-use of printed paper.

Many are the possible changes to the apparatus and method adapted to share information contents through wireless NFC connection, without exiting from the novelty principles of the inventive idea, as well as it is clear that in its practical carrying out the shapes of the depicted details could be different, and the same will be able to be replaced with members technically equivalent.

For instance, the apparatus and method adapted to share information contents through wireless connection, in particular through NFC connection, can manage different kind of users with different privileges or obtain the document to be shared directly through a NFC connection from a mobile terminal. In this last case, the method according to the present invention comprises a receiving state in addition to the sending standard.

Therefore it is easily understandable that the present invention is not limited to an apparatus and method adapted to share information contents through wireless connection, in particular through NFC connection, but it is liable to many alterations, improvements, replacements of parts and equivalent members without however depart from the idea of the invention, as it is better pointed out in the following claims.

The invention claimed is:

1. An apparatus adapted to share electronic files through a wireless connection, said apparatus comprising:
    a memory unit adapted to store at least one predetermined electronic file intended to be shared with an electronic device provided with at least one first short-range communication module as soon as said electronic device becomes reachable to said apparatus;
    at least one short-range radio communication module; and
    a processor adapted to
        determine said at least one predetermined electronic file stored in said memory unit to be transmitted to said electronic device as a consequence of said electronic device coming into a radio communication range of said at least one short-range radio communication module,
        read said at least one predetermined electronic file from the memory unit; and
        cause said at least one short-range radio communication module to automatically transmit said at least one predetermined electronic file to said electronic device directly from said memory unit as a sole consequence of said electronic device coming into the radio communication range of said short-range radio communication module and said at least one predetermined electronic file being present in said memory unit, without the need for explicitly entering into said apparatus or into said electronic device any specific command and without first performing any authentication procedure for transferring said predetermined electronic file neither before nor after said at least one short-range radio communication module has established a communication session with said electronic device.

2. The apparatus according to claim 1, wherein said automatic transmission takes place through a short-range radio communication.

3. The apparatus according to claim 1, wherein said radio communication module is an NFC (Near Field Communication) module.

4. The apparatus according to claim 1, wherein said apparatus comprises at least one power supply module.

5. The apparatus according to claim 4, wherein the power supply module comprises an alternating current to direct current adapter or a rechargeable battery.

6. The apparatus according to claim 1, wherein said apparatus comprises a signaling unit.

7. The apparatus according to claim 6, wherein the signaling unit emits a visual or an audible signal for signaling adapted to signal at least one operation carried out by said apparatus to a user.

8. The apparatus according to claim 1, wherein said apparatus comprises a display or a monitor for displaying and at least one user interface.

9. The apparatus according to claim 8, wherein the display or the monitor is adapted to display said at least one predetermined electronic file, and said at least one user interface comprises a joystick or a control panel adapted to execute operations on said at least one predetermined electronic file.

10. The apparatus according to claim 1, wherein said apparatus comprises a second radio communication module which allows data to be transferred between said apparatus and said electronic device at a transfer speed which is faster than that obtained by the radio communication module.

11. The apparatus according to claim 10, wherein, prior to transmitting said predetermined electronic file to said electronic device, it is verified if a radio communication channel is available for said electronic device through said second radio communication module, and, in the positive case, said radio communication channel is established by exchanging configuration data between said apparatus and said electronic device through said radio communication module, and said predetermined electronic file is transmitted to said electronic device through said second radio communication module.

12. The apparatus according to claim 1, wherein the determining step performed by the processing unit comprises:
detecting the insertion of a removable memory storage unit, containing new electronic files.

13. The apparatus according to claim 1, wherein the determining step performed by the processing unit comprises:
selecting said at least one predetermined electronic file from a list of electronic files present in said memory unit through a user interface unit.

14. The apparatus according to claim 1, wherein the processor is further adapted to automatically connect with the electronic device without input from a user.

15. The apparatus according to claim 14, wherein the connection between the apparatus and said electronic device comprises a Peer-to-Peer modality.

16. A method for sharing electronic files through a wireless connection of a wireless device, said method comprising:
determining, by a processor, at least one predetermined electronic file stored in a memory unit of the wireless device that includes at least one short-range radio communication module, wherein the at least one predetermined electronic file is to be transmitted to an electronic device that includes at least one first short-range communication module as soon as said electronic device becomes reachable to the wireless device as a consequence of said electronic device coming into a radio communication range of said at least one short-range radio communication module,
reading, through said processing unit, said at least one predetermined electronic file from the memory unit;
causing said at least one short-range radio communication module to automatically transmit said at least one predetermined electronic file directly from said memory unit to said electronic device as a sole consequence of said electronic device coming into the radio communication range of said short-range radio communication module and said at least one predetermined electronic file being present in said memory unit, without the need for explicitly entering into said wireless device or into said electronic device any specific command and without first performing any authentication procedure for transferring said predetermined electronic file neither before nor after said at least one short-range radio communication module has established a communication session with said electronic device.

17. The method according to claim 16, wherein said wireless connection is a short-range radio connection.

18. The method according to claim 17, wherein said short-range radio connection is an NFC (Near Field Communication) connection.

19. The method according to claim 16, wherein said method provides for copying said at least one predetermined electronic file to said memory unit from at least one removable memory.

20. The method according to claim 16, wherein said method provides for copying said at least one predetermined electronic file content between said memory unit.

21. The method according to claim 16, wherein said method provides for visually and/or audibly signaling to a user, through a signaling unit for signaling at least one operation carried out by said apparatus.

22. The method according to claim 16, wherein said method provides for displaying said at least one predetermined electronic file through a display and for executing operations on the electronic file through at least one user interface.

23. The method according to claim 16, wherein said method further comprises the steps of verifying the presence of a second radio communication module, and of the associated protocol, on said electronic device, and of transferring data between said apparatus and said electronic device at a transfer speed which is faster than that obtained through the radio communication module.

24. The method according to claim 23, wherein said method further comprises the steps of verifying, prior to transmitting said predetermined electronic file to said electronic device, if a radio communication channel is available for said electronic device through said second radio communication module, and, in the positive case, of establishing said radio communication channel by exchanging configuration data between said apparatus and said electronic device through said radio communication module, and of transmitting said predetermined electronic file to said electronic device through said second radio communication module.

25. A non-transitory computer product which can be loaded into a memory of said apparatus, comprising portions of software code adapted to implement the method according to claim 16.

26. The method according to claim 16, wherein the determining step comprises:
    detecting the insertion of a removable memory storage unit, containing new electronic files.

27. The method according to claim 16, wherein the determining step comprises:
    selecting said at least one predetermined electronic file from a list of electronic files present in said memory unit through a user interface unit.

* * * * *